(12) United States Patent
Best et al.

(10) Patent No.: US 8,083,898 B2
(45) Date of Patent: Dec. 27, 2011

(54) METHOD FOR MANUFACTURING A MACHINE FELT, AND MACHINE FELT

(75) Inventors: Walter Best, Duren (DE); Axel Burmeister, Roetgen-Rott (DE); Christian Molls, Aachen (DE)

(73) Assignee: Heimbach GmbH & Co. KG, Duren (DE)

( * ) Notice: Subject to any disclaimer, the term of this patent is extended or adjusted under 35 U.S.C. 154(b) by 407 days.

(21) Appl. No.: 12/328,032

(22) Filed: Dec. 4, 2008

(65) Prior Publication Data

US 2009/0139600 A1 Jun. 4, 2009

(30) Foreign Application Priority Data

Dec. 4, 2007 (EP) .................................... 07023459

(51) Int. Cl.
*D21F 7/10* (2006.01)
*D21F 7/08* (2006.01)
*B29C 65/16* (2006.01)

(52) U.S. Cl. ..................... 162/358.2; 162/900; 162/904; 28/110; 156/272.8

(58) Field of Classification Search .................. 162/116, 162/348, 358.1, 358.2, 361, 900–904; 28/110, 28/141, 142; 139/383 AA, 383 A, 425 A; 442/366, 387, 388, 402; 156/304.1, 304.6, 156/272.8; 428/57, 58
See application file for complete search history.

(56) References Cited

U.S. PATENT DOCUMENTS

| | | | |
|---|---|---|---|
| 3,767,353 A | 10/1973 | Gaffney | |
| 3,917,889 A | 11/1975 | Gaffney et al. | |
| 4,123,491 A | 10/1978 | Larsen | |
| 5,015,220 A | 5/1991 | Legge et al. | |
| 5,268,076 A | 12/1993 | Best et al. | |
| 5,360,656 A | 11/1994 | Rexfelt et al. | |
| 5,864,931 A | 2/1999 | Best et al. | |
| 6,283,165 B1 * | 9/2001 | Best ......................... | 139/383 A |
| 6,811,849 B2 | 11/2004 | Best | |
| 2007/0235155 A1 * | 10/2007 | Best et al. .................. | 162/358.2 |

FOREIGN PATENT DOCUMENTS

| | | |
|---|---|---|
| EP | 0307182 | 3/1989 |
| EP | 0464258 | 1/1992 |
| EP | 0285376 | 1/1993 |
| EP | 0947627 | 10/1999 |
| EP | 1045066 | 10/2000 |
| EP | 1209283 | 11/2000 |
| EP | 1837440 | 9/2007 |
| GB | 2254287 | 10/1992 |
| WO | WO 92/17643 | 10/1992 |
| WO | WO 98/56982 | 12/1998 |

* cited by examiner

*Primary Examiner* — Eric Hug
(74) *Attorney, Agent, or Firm* — Berenato & White, LLC

(57) ABSTRACT

A method for manufacturing a machine felt. Firstly a tube having a longitudinal yarn layer is manufactured with a peripheral length double the length of the machine felt, and a width that corresponds to the width of the machine felt. The tube is compressed into a flattened tube with the formation of longitudinal yarn loops which are exposed by the removal of fibers of a fiber batt layer. An auxiliary substrate web is manufactured with a width that is less than that of the machine felt; for the longitudinal yarns and/or for the auxiliary substrate web, a material is used that absorbs laser energy; the longitudinal yarns are brought together with the auxiliary substrate web and connected by a laser beam; the auxiliary substrate web is helically wound until the tube is formed; and upon exposure of the longitudinal yarn loops, the auxiliary substrate web(s) are also removed.

39 Claims, 4 Drawing Sheets

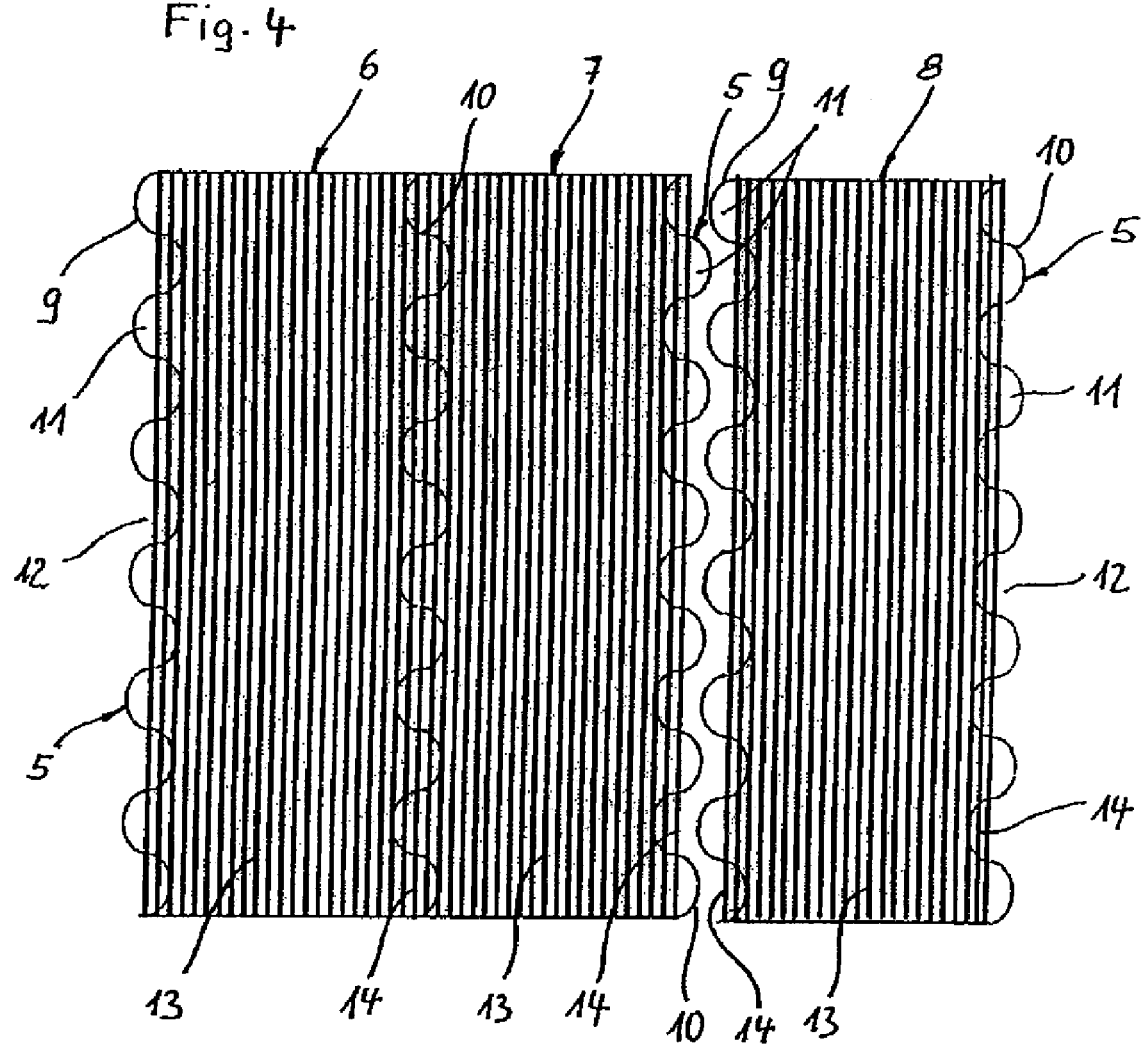

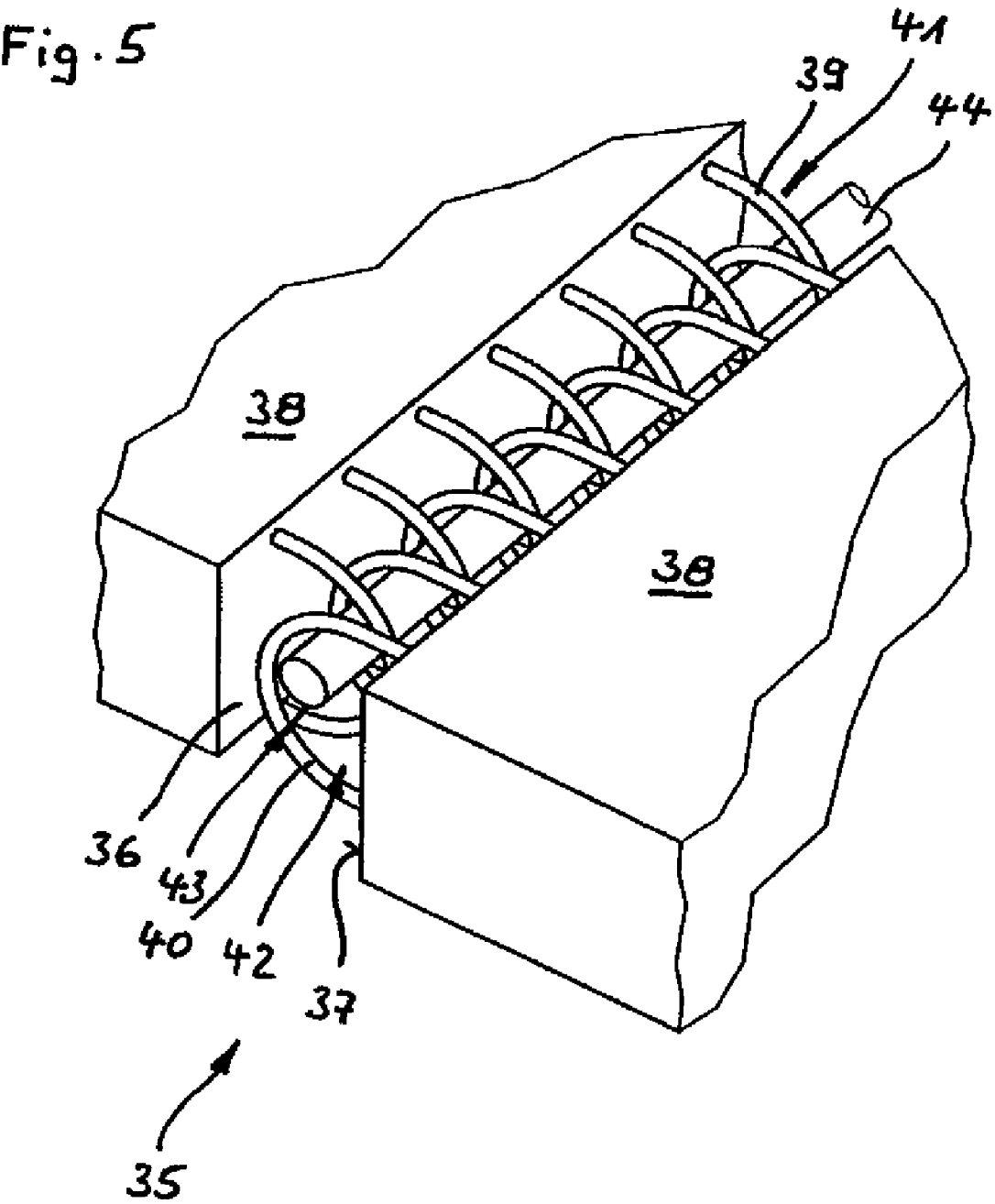

METHOD FOR MANUFACTURING A MACHINE FELT, AND MACHINE FELT

CROSS-REFERENCE TO RELATED APPLICATIONS AND CLAIM TO PRIORITY

This application is related to application number 07 023 459.6, filed Dec. 4, 2007 in the European Patent Office, the disclosure of which is incorporated by reference and to which priority is claimed.

FIELD OF THE INVENTION

The invention relates to a method for manufacturing a machine felt of finite length, in which firstly a tube having at least one longitudinal yarn layer, made up respectively of longitudinal yarns proceeding in parallel fashion, is manufactured with a peripheral length that corresponds to at least double the length of the machine felt to be produced, and with a width that corresponds at least to the width of the machine felt to be produced; and in which the tube is then compressed into a flattened tube with mutual abutment of its inner sides and with the formation of front ends and of longitudinal yarn loops there which are exposed by the removal of fibers of a previously applied fiber batt layer, and with formation of a respective channel extending along the associated front end. The invention further relates to a machine felt of finite length having a substrate and having a fiber batt layer fastened to the substrate, the substrate comprising yarns that form longitudinal yarn layers arranged one above another and having longitudinal yarns, extending respectively in parallel fashion and spaced apart from one another, that form longitudinal yarn loops protruding at front ends of the machine felt.

BACKGROUND OF THE INVENTION

Machine felts in which a substrate made up of plastic textile yarns is equipped with a fiber batt layer made of plastic fibers are used in particular in the sector of paper machine belts. Such paper machine belts are used principally as press felts in the press section of a paper machine. The nonwoven fiber layer is manufactured, in principle, in such a way that one or more nonwoven webs are needle felted onto the substrate on one or both sides and are thereby compressed into felts.

Machine felts of this kind are for the most part manufactured in endless fashion. A method suitable for this is evident from EP 0 464 258 A1. In this method the substrate, constituted by a woven or knitted fabric, is built up by winding a substrate web strip whose width is substantially less than the intended width of the substrate, in the form of a helix or screw, onto two spaced-apart rollers until the intended width of the substrate is reached. Simultaneously or subsequently, the substrate is covered with fiber batt webs in the same fashion, and needled to the substrate. The side edges of a felt tube constructed in this fashion are then trimmed, thus producing straight side edges that extend in the machine direction.

With this type of manufacture, because of the winding process the longitudinal yarns proceed at an angle to the machine direction of the machine felt and continuous transverse yarns are not obtained, so that the transverse strength of the machine felt is not very high. To obtain better transverse strength, it has been proposed to connect the edges of the substrate web strips to one another, for example by stitching (U.S. Pat. No. 5,360,656). In the case of substrates manufactured from longitudinal and transverse yarn layers, the edges of the substrate web strips are, according to EP 0 947 623 A1, connected to one another by the fact that the transverse yarns of the transverse yarn layer interengage at the edges, and a connecting yarn is put in place there and welded to the interengaging portions of the transverse yarns. This has the disadvantage, however, that in the region of the edges a strip is produced which, because of the different arrangement and density of the yarns, has different properties (in particular a lower permeability) than the other surfaces of the machine felt. This can result in markings on the paper web.

To remedy this, it has been proposed in EP 1 209 283 A1 to configure the side edges of the substrate web strips in meander fashion with successive projections and indentations, and to abut the substrate web strips against one another in such a way that the projections and indentations interengage, such that the projections completely fill up the indentations. Connection of the edges then takes place via connecting means, for example stitched seams or adhesive tapes. This, too, results in changes in the properties of the completed felt belt in the region of the interengaging edges.

In a further development of the winding method described above, the problem of transverse strength and of increased volume was solved by providing transverse yarns that extend over the entire width of the machine felt (cf. EP 1 837 440 A1). With this method, a first endless substrate module was produced in one or more plies by helically winding on at least one auxiliary substrate web having longitudinal yarns lasered on before, during, or after winding; and onto this substrate module are placed, in one or more plies, substrate module segments that are made up of an auxiliary substrate web and yarn layers lasered thereonto, the substrate module segments being arranged next to one another in such a way that their yarns proceed in a transverse direction. At least one fiber batt web is then needle felted in order to connect the substrate modules and form the fiber batt layer. The function of the respective auxiliary substrate webs is simply to hold the longitudinal and transverse yarns in the intended positions during the manufacturing operation. The auxiliary substrate webs are very largely destroyed upon needle felting of the fiber batt web(s) in order to form the fiber batt layer, and thus become nonfunctional.

Endless machine felts of the kind described above have the disadvantage that installing them, for example, in the press section of a paper machine is difficult. More advantageous in this respect are machine felts that exist at a finite length and comprise at their front ends coupling elements by way of which the ends of the machine felt can be coupled to one another, in the manner of a seam, once in the machine. Such machine felts are therefore also referred to as seam felts.

For the manufacture of a machine felt of this kind, it is proposed in U.S. Pat. No. 5,015,220 firstly to manufacture a felt tube with a peripheral length that corresponds approximately to twice the length of the machine felt to be produced, and with a width that corresponds to the width of the machine felt. The felt tube is made up of a substrate having longitudinal and transverse yarns (such that the longitudinal and transverse yarns can also be present as yarn layers), and of a fiber batt layer that was constituted by needle felting or adhesive bonding of fiber batt webs. The felt tube is then reshaped, by compression transversely to its surface, into a flattened tube whose inner sides rest against one another. The flattened tube then has approximately the length of the machine felt to be produced. At its front ends, transverse yarns and fibers are sufficiently far apart that the longitudinal yarn loops present in these regions are exposed and protrude. At each front end, the respectively pertinent longitudinal yarn loops enclose a channel extending along the front end. When the longitudinal fiber loops of the two front ends are caused to overlap, a common passthrough channel is produced. A coupling wire that connects the two ends of the machine felt to one another can then be inserted into this passthrough channel.

A further development of this machine felt is evident from EP 0 947 627 A1. According to this document, a longitudinal yarn loop is manufactured by helically winding a longitudinal yarn over two spaced-apart rollers, forming two longitudinal yarn layers arranged one above another and forming longitudinal yarn loops at the front ends, and a transverse yarn insert is then slid into the interstice between the longitudinal yarn layers. The transverse ply extends over the width of the longitudinal yarn tube. It prevents the longitudinal yarns from being pressed into one another upon subsequent needle felting of a fiber batt layer, thereby causing yarn displacements that result in a nonuniform properties profile. As in the case of the machine felt according to U.S. Pat. No. 5,015,220, however, the transverse yarns cannot prevent the longitudinal yarns from shifting in the transverse direction upon needling. Their effect is therefore limited, especially since the insertion operation creates increased manufacturing complexity.

The underlying object of the invention is to make available a method for manufacturing a machine felt of finite length having a substrate made of yarn layers, in which displacement of the yarns does not occur especially upon manufacture of the fiber batt layer. A further object is to design a machine felt of finite length in which the yarns of the yarn layer proceed in each case in parallel fashion and largely equidistant from one another.

SUMMARY OF THE INVENTION

The first part of the object is achieved, according to the present invention, in that firstly at least one auxiliary substrate web is manufactured with a width that is less than that of the machine felt that is to be produced; that for the longitudinal yarns and/or for the at least one auxiliary substrate web, at least in part a material is used that has the property of absorbing laser energy and of being capable of being brought by means of laser energy, at least superficially and at least partially, to melting temperature; that the yarns are brought together with the auxiliary substrate web in its longitudinal direction and connected to one another by the action of a laser beam; that the auxiliary substrate web(s) is or are helically wound until the tube is formed; and that upon exposure of the longitudinal yarn loops, the portion of the auxiliary substrate web that is present there is also removed.

The basic idea of the invention is thus to manufacture the tube, having the at least one longitudinal yarn layer, by the fact that an auxiliary substrate web having longitudinal yarns lasered thereonto concurrently or thereafter is helically wound in single- or multiple-ply fashion until the tube is formed. Because of the action of the laser energy, the yarns and auxiliary substrate web enter into a melted connection. The use of an auxiliary substrate web causes the longitudinal yarns fastened thereto to be held in the intended positions, i.e. the spacing at which they were applied onto the auxiliary substrate web is also retained in the subsequent method steps, in particular when fiber batt webs are needle felted in order to form the fiber batt layer. Helical winding of the auxiliary substrate web makes it possible to configure tubes of almost any width and length, and thus also to obtain very wide and very long machine felts. Consideration must be given in this context to the fact that the tube must at first exist at least at double the length in order to obtain, after compression into a flattened tube, a finite substrate structure whose length corresponds approximately to that of the machine felt to be produced. Because displacements of the longitudinal yarns are avoided especially during the manufacturing process, the machine felt is notable for properties that are uniform over its surface, in particular with regard to permeability to water. The auxiliary substrate web(s) can easily be removed in the region of the longitudinal yarn loops by cutting off and detaching those segments that are connected to the longitudinal yarn loops.

For the winding process, in simple fashion only one auxiliary substrate web is wound, together with the longitudinal yarns, from one side of the tube that is to be formed to its other side, and then cut off straight at the edges. This yields, in the context of the tube, a single-ply longitudinal yarn layer that becomes two-ply after compression of the tube to yield the flattened tube. Winding can, however, be continued in the opposite direction to the origin point, yielding a two-ply longitudinal yarn layer already upon manufacture of the tube. Alternatively or in combination therewith, multiple auxiliary substrate webs can also be wound simultaneously or successively onto one another, thus already yielding several plies of longitudinal yarn layers in the tube, the number of said plies doubling upon compression into the flattened tube.

For machine felts whose transverse strength is not subject to particular requirements, it is sufficient if the substrate of the machine felt is constituted exclusively from longitudinal yarn layers. If the requirements in terms of transverse strength and volume are greater, it is advisable for at least one transverse yarn layer, having transverse yarns proceeding continuously and parallel to one another over the width of the tube or flattened tube, to be applied on the inner and/or outer side of the tube (and in this case over at least half its length) or at least on one of the two outer sides of the flattened tube. This should preferably occur in such a way that the transverse yarn layer or layers is or are located externally after connection of the front ends of the flattened tube, i.e. form(s) the paper side. An internally located arrangement, i.e. on the machine side, is, however, also a possibility.

In a further embodiment of the invention, provision is made that for manufacture of the transverse yarn layer, firstly individual substrate module segments are manufactured, having an extension in one direction of the substrate module segments that corresponds to the width necessary for manufacture of the completed machine felt, the substrate module segments each being formed by the combination of an auxiliary substrate web with yarns fastened thereonto, and the auxiliary substrate web and/or the yarns having the property of absorbing laser energy and of being capable of being brought by means of laser energy, at least superficially and at least partially, to melting temperature; that the connection between the auxiliary substrate web and the transverse yarns is produced by the action of a laser beam; and that the substrate module segments are successively placed onto and against one another onto the tube or the flattened tube in its longitudinal direction, in such a way that the transverse yarn layer is thereby created. The substrate module segments can be manufactured, in this context, in such a way that firstly an auxiliary substrate web of greater length is manufactured and the yarns are lasered on; and that the belt thus formed is then divided up at intervals that correspond to the machine felt width necessary for manufacture of the completed machine felt. The yarns are then brought together with the auxiliary substrate web in the same way as in the context of combining the auxiliary substrate web and longitudinal yarns for the purpose of manufacturing the tube.

The transverse yarns can be identical in nature to the longitudinal yarns. They can also, however, be thicker or thinner or be of different structural configurations, but should have the same properties regarding their absorbent ability with respect to laser energy. The number of yarns per unit length also need not be the same, i.e. in this regard there can be different spacings between said yarns.

The auxiliary substrate web(s) for the substrate module segments should be manufactured with an extension, transversely to the yarns, of 0.4 to 6 m, preferably 3 to 6 meters. For the auxiliary substrate web(s) for the longitudinal yarns, a width from 0.2 m to 1.5 m is sufficient.

To ensure that destruction of the auxiliary substrate web(s), and thus lateral displacements of the yarns, does not occur upon application, in particular upon needle felting, of the fiber batt webs, it is advisable to use for the auxiliary substrate web(s) materials which have a structural strength such that after the machine felt is completed, they exist in a state that is undamaged or damaged at most so that they still make a contribution to the positional stability of the yarns, i.e. still form bridges between them. Suitable for this purpose are, for example, plastic meshes such as those known e.g. from EP 0 285 376 B1, EP 0 307 182 A, U.S. Pat. No. 3,767,353 A, U.S. Pat. No. 3,917,889 A, U.S. Pat. No. 4,123,491 A, and/or fiber batts and/or perforated plastic films, such as those disclosed, for example, in WO 92/17643, WO 98/56982, or GB 2 254 287 A. The openings in the meshes or films should be sufficiently large that on the one hand sufficient stability is still present, but on the other hand the needles largely pass through said openings upon needling of the fiber batt webs, and thus damage the auxiliary substrate web(s) only a little or not at all. A basis weight from 20 to 250 g/m$^2$, preferably from 30 to 200 g/m$^2$, is advisable for the auxiliary substrate web(s).

If the yarns are capable of absorbing laser energy, the auxiliary substrate web(s) should be made of a material that absorbs laser energy substantially less than the yarns, or that absorbs no laser energy. These are, as a rule, the usual thermoplastic materials such as polyamide 4.6, 6, 6.6, 6.10, 6.12, 11, and 12, as well as polyester, polypropylene, etc. The same correspondingly applies to the fiber batt web(s) to be needle felted; in the case of multiple layers, different fiber gauges can be provided, preferably in such a way that the finest fiber gauges end up on the paper-side surface of the completed machine felt.

For the auxiliary substrate web and/or for the yarns to be connected to it, a material can be used which contains an additive that makes the yarns or the auxiliary substrate web capable of absorbing laser energy. Examples of such additives are NIR-active substances (i.e. those active in the near infrared region) that absorb, for example, in the region of the 808 nm, 940 nm, 980 nm, or 1064 nm wavelengths. Carbons or colorless additives such as Clearweld® of Gentex or Lumogen® IR of BASF are suitable for this, for example. The additive preferably extends over the entire length of the yarns. The additive can be incorporated into yarns and/or be applied onto the surface of the yarns. If the additive is incorporated, the weight proportions should be 0.10% to 2.5%.

Provision is further made, according to the invention, for the yarns to be arranged parallel to the side edges of the auxiliary substrate webs, preferably with identical spacings. As a result of the helical winding process of the auxiliary substrate webs equipped with the longitudinal yarns, after the tube is completed the longitudinal yarns proceed not exactly in the tube's longitudinal direction, but slightly obliquely with respect thereto.

To ensure that a displacement of the auxiliary substrate webs, with the yarns fastened thereto, does not occur during the manufacturing process, it is useful for the mutually abutting edges of the auxiliary substrate web(s) to be connected to one another. This can be done in various ways.

On the one hand, the edges can be caused to overlap and then connected to one another in the overlap region. In practical terms, this is done in such a way that one of the two edges is not covered with yarns over a width from 10 to 50 mm, and that edge is then caused to overlap with the edge located next to it and equipped with yarns. The two edges can then be connected by welding using ultrasound, or by adhesive bonding. The yarns themselves can also be utilized for this, once again by being impinged upon by a laser beam in the edge region. The edges can, however, also be stitched to one another. Because of the thinness, the thickening in the overlap region is acceptable for many applications.

A thickening does not occur if the edges are butted against one another. In this case the edges can be connected in such a way that the edges are equipped with successive, complementary projections and indentations; and that the edges are then mutually abutted so that they interengage with their projections and indentations; and that lastly the projections of the mutually abutting edges are connected to one another. The projections can be connected by the fact that at least one yarn is laid over the projections, preferably parallel to the other yarns, and this one yarn (which can also be multiple yarns proceeding in parallel fashion) is connected to some or all of the projections.

In terms of method, two alternatives are available here. For the first alternative, after interengagement of the projections and indentations at least one yarn is laid over the projections and then fastened to them. As an alternative thereto, however, provision can be made that prior to interengagement of the projections and indentations (preferably as the other yarns are put in place and fastened), at least one yarn is laid over the projections and indentations of at least one edge of the respective auxiliary substrate web and is fastened to the projections; and that after interengagement of the projections and indentations, the at least one yarn is also fastened to the projections of the abutting edge. The application of the at least one yarn prior to interengagement can be confined to one of the two edges of the respective auxiliary substrate web, but can also occur on both edges, preferably symmetrically in such a way that the yarn or yarns extend at maximum to half the width (transversely to the longitudinal direction) of the projections.

The conformation of the projections and indentations is relatively unrestricted. Examples thereof are evident from EP 1 209 283 A1. The projections should preferably fill up the entire area of the indentations. The at least one yarn can be fastened in various ways, but preferably so that a yarn capable of absorbing laser energy is used for this as well, and it is then fastened by means of a laser beam to at least some of the projections, preferably to all projections.

Usefully, the yarns proceeding over the edges should correspond to the other yarns at least in terms of structure and specifications. The yarns should also be applied onto the edges in a quantity and at a spacing such that after interengagement of the projections and indentations, the yarn density in the region of the edges does not deviate from the yarn density elsewhere. These actions serve to achieve uniform properties over the surface of the felt belt.

Provision is further made according to the present invention that the fiber batt layer is manufactured by needle felting at least one fiber batt web onto the tube or onto the flattened tube. The term "needling" is to be understood very generally in this context, i.e. it is intended also to embrace needling techniques using liquid jets.

As an alternative thereto or in combination therewith, the fiber batt layer can also be manufactured at least in part by the fact that at least one fiber batt web having the width of the auxiliary substrate web for the longitudinal yarns is needle felted, before or during winding, onto the combination of auxiliary substrate web and yarns.

The subject matter of the invention is furthermore a machine felt of the kind cited initially that is characterized according to the present invention in that the longitudinal yarns, with the exception of the longitudinal yarn loops, are fastened to at least one auxiliary substrate web which is present in a state that is not (completely) destroyed. The machine felt is thus notable for the fact that the auxiliary substrate web(s) used for its manufacture is or are still recognizably present, since it or they either has or have not been damaged by the needling process, or has or have been damaged in terms of its or their structure only to the extent that it or they still make(s) a contribution to retaining the yarns fastened to it or them in the intended position, i.e. in particular equidistantly.

The longitudinal yarn structures can be constituted by at least one longitudinal yarn helically wound transversely to the longitudinal direction. It is more useful, however, if the longitudinal yarn structures are constituted by at least one group, made up respectively of multiple longitudinal yarns, that is helically wound transversely to the longitudinal direction and is connected respectively to an auxiliary substrate web. An oblique position of the longitudinal yarns is established because of the helical winding process. A multiple-ply structure can be obtained by winding back and forth, with the longitudinal yarns intersecting at an acute angle.

As already mentioned, depending on the intended application it may be sufficient if the substrate of the machine felt is made up only of longitudinal yarn layers. With more stringent requirements for the felt, however, it is useful if the substrate comprises, at least on an outer side and/or an inner side of the longitudinal yarn layer(s), further yarns that constitute at least one transverse yarn layer having transverse yarns proceeding parallel to one another over the width of the machine felt. This can occur in a manner as mentioned above in the context of the description of the method according to the present invention. The transverse yarns should be fastened to auxiliary substrate webs that are present in an undestroyed state, preferably such that a positional immobilization of the transverse yarns is effected. As in the case of the longitudinal yarns, the auxiliary substrate webs for the transverse yarns should likewise be present in a state in which they are either undamaged or else damaged only to the extent that they still make a contribution to positional immobilization. Preferably, a transverse yarn layer should be applied exclusively onto that outer side of the longitudinal yarn layer or layers which is externally located after connecting of the front ends of the machine felt.

The property of being able to absorb laser energy can be obtained with the aid of the additives described above. The yarns can be embodied as monofilaments; bicomponent yarns, in which only one of the two components then contains the additive, are also a possibility. The bicomponent yarns should comprise a core and a jacket surrounding it, the additive then being contained only in the jacket. The monofilaments can have different cross-sectional shapes, e.g. circular, oval, rectangular, square, cloverleaf-shaped, star-shaped, etc.

Alternatively to or in combination with monofilaments, the yarns of at least one yarn layer can also be embodied as multifilaments made up of individual filaments. In this case only some of the individual filaments need to be equipped with the additive, a proportion of at maximum 50% being sufficient. When impinged upon by the laser beam, the multifilaments become rigid because of the even partial welding of the individual filaments to one another.

Also possible, however, are monofilament twisted yarns made up of, for example, two to twelve monofilaments; here as well, not all the monofilaments need to be equipped with additives. It is sufficient if at maximum 50% thereof comprise such additives. Depending on how the process is performed, stiffening of the twisted yarns can be effected by welding the individual monofilaments to one another.

Provision can furthermore be made to use alternatingly different yarns, for example alternatingly monofilaments and multifilaments, monofilaments and twisted yarns or multifilaments. The material can also be used in alternating fashion, however, for example by using yarns made alternatingly of polyamide 6 and 6.10, or alternatingly of polyamide 6 and 6.12, or alternatingly of polyamide 6.6 and polyamide 4.6, or alternatingly of polyamide and polypropylene.

As regards the auxiliary substrate web(s) in terms of its or their structural strength with respect to the needling process, what is disclosed above in the context of the method according to the present invention is of course also intended according to the present invention to be the case for the connection of the auxiliary substrate webs to one another. In that context it is once again useful if the connection thereof is such that they are not completely dissociated by the needling process, but if the connection still makes a contribution to the positional stabilization of the yarns.

The transverse yarns need not extend exactly at a right angle to the longitudinal direction of the machine felt. The possibility also exists for the transverse yarns to proceed at an angle from 75° to 125°, preferably 80° to 100°, to the longitudinal direction of the machine felt. If the substrate comprises at least two transverse yarn layers, the possibility exists of arranging the transverse yarns so that the transverse yarns of the one transverse yarn layer and the transverse yarns of the other transverse yarn layer intersect, preferably symmetrically, so that the transverse yarns of the one transverse yarn layer deviate from the perpendicular to the longitudinal direction of the machine felt by the same angle as the transverse yarns of the other transverse yarn layer, but with the opposite sign.

In order to achieve uniform properties over the surface, the longitudinal yarns and/or the transverse yarns that may be present should have the same spacing from one another. It is useful in this context if the spacing of the longitudinal yarns and the spacing of the transverse yarns (if present) is the same. Likewise, different yarns can be used for the longitudinal yarns than for the transverse yarns, but also identical yarns.

The number of yarns per unit length can furthermore be different in the longitudinal yarn layer than in the transverse yarn layer. In particular, the number of yarns in the longitudinal yarn layer can be between 10 and 100 yarns per cm, preferably 20 to 50 yarns per cm, while the number of yarns in the transverse yarn layer can be between 20 and 100 yarns per cm, preferably between 30 and 60 yarns per cm.

Lastly, provision can be made according to the present invention for a further material web, for example a transverse yarn layer, a perforated film, a fiber batt made of coarse fibers, a woven fabric web, or the like, to be arranged between two longitudinal yarn layers. Said web can be placed between the two plies of the flattened tube upon manufacture of the machine felt, fastening then occurring by needle felting a fiber batt.

BRIEF DESCRIPTION OF THE FIGURES

The invention is elucidated further, with reference to an exemplifying embodiment, in the drawings, in which:

FIG. 4 is a plan view, enlarged with respect to FIG. 1, of a portion of the auxiliary substrate web for manufacture of the tube; and FIG. 5 is an oblique view of part of the seam region of the completed machine felt.

DETAILED DESCRIPTION OF THE PREFERRED EMBODIMENT(S)

Figure 1:
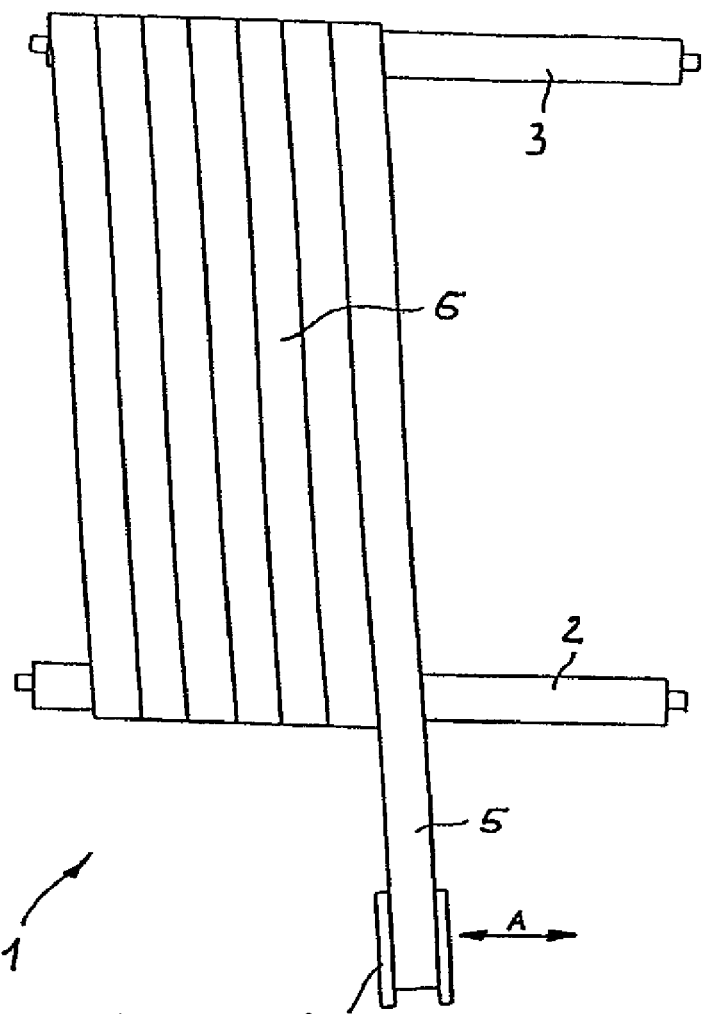
FIG. 1 is a plan view of an apparatus for manufacturing a tube for the machine felt according to the present invention.

Apparatus 1 depicted in FIG. 1 comprises two spaced-apart rollers 2, 3 that have parallel rotation axes and are driven in the same direction. Located at a distance from lower roller 2 is a supply roll 4 onto which a plastic mesh tape 5 is wound. Plastic mesh tape 5 is pulled off supply roller 4 as rollers 2, 3 are driven, and is wound onto the two rollers 2, 3. In that context, supply roll 4 is moved in the direction of arrow A, i.e. parallel to the rotation axes of rollers 2, 3. As a result, plastic mesh tape 5 is progressively wound to the right in helical fashion onto rollers 2, 3. The advance of supply roll 4 in the direction of arrow A is dimensioned so that plastic mesh tape 5 ends up with the mutually adjacent edges butting against one another. Supply roll 4 is correspondingly skewed so that jams do not occur. The winding process is continued until an oval tube has been produced by means of plastic mesh tape 5, the width of said tube corresponding approximately to the width (before heat-setting) of the machine felt to be manufactured.

Figure 2:
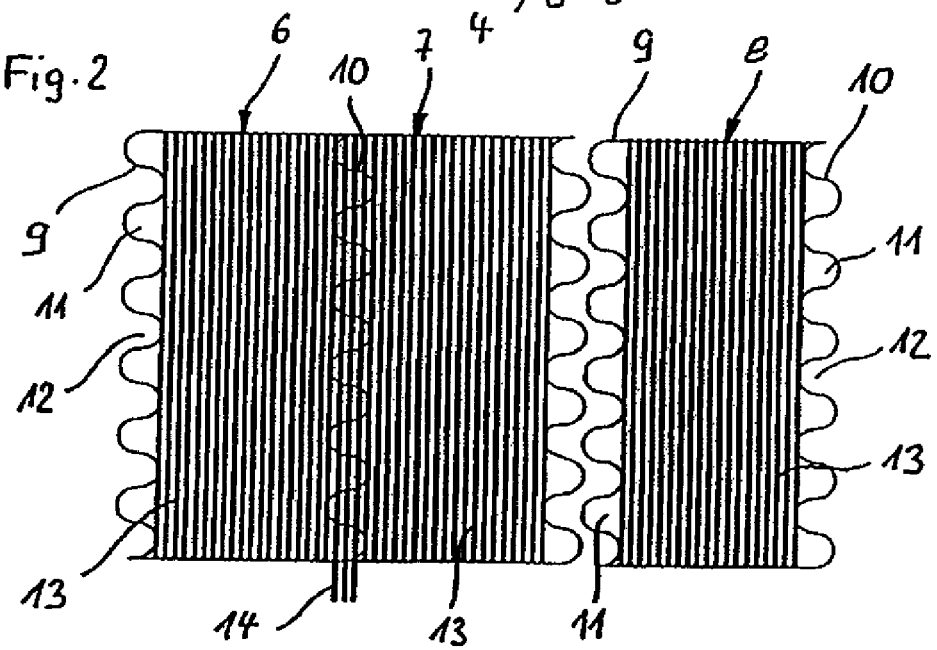
FIG. 2 is a plan view, enlarged with respect to FIG. 1, of a portion of the auxiliary substrate web for manufacturing the tube.

The enlargement in FIG. 2 depicts three partial webs 6, 7, 8 of plastic mesh tape 5. It is evident that plastic mesh tape 5 (and therefore partial webs 6, 7, 8) has complementary wave-shaped profiles on both longitudinal edges 9, 10, so that projections (labeled 11 by way of example) and complementary indentations (labeled 12 by way of example) are alternatingly formed. In the case of partial webs 6, 7, projections 11 and indentations 12 interengage in the manner of a tooth set, such that projections 11 fill the entire area of indentations 12. Partial web 8 is shown at a distance from partial web 7. In actuality, it enters the apparatus in such a way that projections 11 fit into indentations 12 in the same way as is the case for the adjacent longitudinal edges 9, 10 of partial webs 6, 7. The partial web adjoining partial web 6 to the left has been omitted.

As is likewise evident from FIG. 2 (and not depicted in FIG. 1), longitudinal yarns (labeled 13 by way of example) extending in the longitudinal direction of plastic mesh tape 5 are applied thereonto in parallel fashion and with identical spacings from one another, although longitudinal edges 9, 10 are left without yarns. Longitudinal yarns 13 are made of a thermoplastic, and are equipped with an additive that makes them capable of absorbing laser energy. Longitudinal yarns 13 are spot-welded to plastic mesh tape 5 by the action of a laser beam going back and forth transversely to them. The connection can be created, in a corresponding apparatus, even before plastic mesh tape 5 is wound onto supply roll 4. In this case what is present on supply roll 4 is not only a plastic mesh tape 5, but a combination of plastic mesh tape 5 and longitudinal yarns 13 fastened thereto.

Three further longitudinal yarns (labeled 14 by way of example) are applied onto longitudinal edges 9, 10 and onto projections 11. Said yarns are identical in nature to longitudinal yarns 13 and thus also capable of absorbing laser energy. Like longitudinal yarns 13, they are spot-heated to melting temperature using a laser beam, and as a result become connected to projections 11 of plastic mesh tape 5. As a result, longitudinal edges 9, 10 and thus partial webs 6, 7, 8 become connected to one another. Longitudinal yarns 14 on longitudinal edges 9, 10 are at identical spacings from one another and from the adjacent longitudinal yarns 8, so that the yarn density in the region of longitudinal edges 9, 10 corresponds to that in the remaining area.

In the example according to FIG. 2, the application of longitudinal yarns 14 onto longitudinal edges 9, 10 occurs after the application of longitudinal yarns 13 between longitudinal edges 9, 10. Selection of a reverse sequence is not precluded, however, i.e. firstly the connection of partial webs 6, 7, 8 by means of longitudinal yarns 4 is effected, and then the remaining longitudinal yarns 13 are applied. This can occur in separate apparatuses in each case, which bring about on the one hand the placement of longitudinal yarns 13, 14 and on the other hand fastening by means of a laser. The possibility also exists, however, of carrying this out in one working step if this apparatus is arranged between rollers 2, 3, and if longitudinal yarns 13, 14 are simultaneously placed next to one another and fixed in place. In this case, however, it is necessary for the two rollers 2, 3 to be moved opposite to the direction of arrow A, and for supply roll 4 to be retained in stationary fashion.

Figure 3:
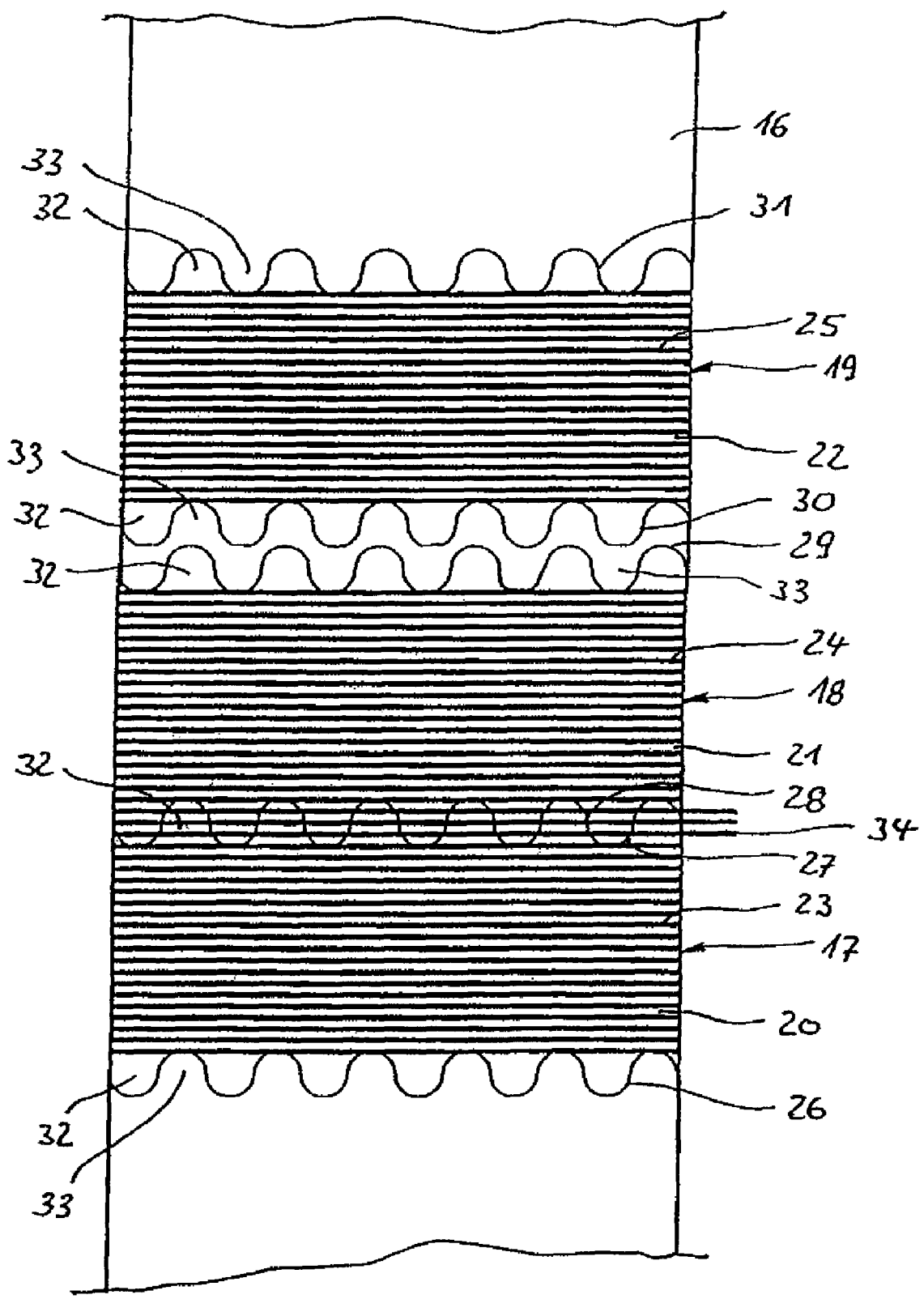
FIG. 3 is a plan view of a portion of the flattened tube with substrate module segments placed thereon for manufacture of a transverse yarn layer.

FIG. 3 shows in part, at approximately the scale of FIG. 1 but substantially reduced as compared with FIG. 2, a flattened tube 16 which was manufactured by compressing the tube made available on apparatus 1 according to FIG. 1 after the removal of rollers 2, 3, so that the inner sides of the tube formed by plastic mesh tape 5 come into mutual contact. This yields a flat structure having the width of the tube formed on the apparatus according to FIG. 1 and having a length that corresponds approximately to the spacing between rollers 2, 3 of apparatus 1 plus their diameter. Flattened tube 16 has the length and width of the completed machine felt, but with an overdimension that accounts for shrinkage upon subsequent heat-setting. Longitudinal yarns 13, 14, which are in fact visible here, are not depicted.

Substrate module segments 17, 18, 19 are placed onto the upper side of flattened tube 16. These substrate module segments 17, 18, 19 are constructed in exactly the same way as the combination of plastic mesh tape 5 and longitudinal yarns 13 from which the tube was manufactured on the apparatus according to FIG. 1. They are each made up of a plastic mesh tape 20, 21, 22 onto which transverse yarns (respectively labeled 23, 24, 25 by way of example) are applied. Transverse yarns 23, 24, 25 are identical in nature to longitudinal yarns 13, 14 on plastic mesh tape 5 (omitted in FIG. 3), and are therefore fastened to plastic mesh tape 20, 21, 22 in the same way, by means of a laser beam. They are each at identical spacings from one another. Substrate module segments 17, 18, 19 are placed onto flattened tube 16 with transverse yarns 23, 24, 25 at the bottom, so that transverse yarns 23, 24, 25 are in contact with longitudinal yarns 13, 14.

Substrate module segments 17, 18, 19 have transverse edges 26 to 31 that are left unoccupied by transverse yarns 23, 24, 25. They are equipped, in the same way as longitudinal edges 9, 10 of plastic mesh tape 5, with successive projections (labeled 32 by way of example) and with complementary indentations (labeled 33 by way of example). Lower transverse edge 28 of middle substrate module segment 18 is abutted against upper transverse edge 27 of lower substrate module segment 17 so that their projections 32 and indentations 33 interengage in the manner of a tooth set. Three transverse yarns (labeled 34 by way of example) are placed over projections 32 and fastened to them. The two substrate module segments 17, 18 are connected to one another via transverse yarns 34. Here as well, fastening can be effected by means of a laser beam.

Upper substrate module segment 19 is placed onto flattened tube 16. For connection to the middle substrate module segment 18, upper substrate module segment 19 must still be shifted far enough toward middle substrate module segment 18 that projections 32 on lower transverse edge 30 fit into indentations 33 on upper transverse edge 29 of middle substrate module segment 18 in the same way as between substrate module segments 17, 18. Here again, three further transverse yarns can be put in place and connected to projections 32. Further substrate module segments are successively placed in this fashion against the respectively preceding substrate module segment and respectively connected to it, until flattened tube 16 is completely covered on one side with substrate module segments 17, 18, 19. In theory, any number of further substrate module segments can additionally be built up. The possibility also exists, of course, of performing this on the other flat side of flattened tube 16.

FIG. 4 is a depiction analogous to FIG. 2, although the manufacturing procedure is different. Identical reference characters are used for identical parts.

As in the case of the embodiment according to FIG. 2, three partial webs 6, 7, 8 of plastic mesh tape 5 are depicted in part. Partial webs 6, 7, 8 each have, on both longitudinal edges 9, 10, complementary wave-shaped projections 11 made of plastic mesh tape 5, and indentations 12 complementary thereto. In the case of partial webs 6, 7, projections 11 and indentations 12 are already interengaged in the manner of a tooth set, whereas this is not yet the case for partial web 8 with respect to partial web 7.

Longitudinal yarns (labeled 13 by way of example) extend, in parallel fashion and with identical spacings from one another, in the longitudinal direction on plastic mesh tape 5 and thus on partial webs 6, 7. Said yarns are spot-welded to plastic mesh tape 5 by the action of a laser beam going transversely back and forth.

In contrast to the procedure in the case of the exemplifying embodiment according to FIG. 2, as shown especially by partial web 8, further longitudinal yarns (labeled 14 by way of example) are applied, preferably together with longitudinal yarns 13, onto plastic mesh tape 5; they extend over projections 11 and indentations 12, specifically on both longitudinal edges 9, 10. These longitudinal yarns 14 are welded to projections 11 by the action of a laser beam, in the same way that longitudinal yarns 13 are welded to plastic mesh tape 5. Longitudinal yarns 14 are at identical spacings from one another and from longitudinal yarns 13, and proceed parallel to them. Longitudinal yarns 14 are laid respectively over projections 11 and indentations 12, so that half the extension of projections 11 transverse to the extension of longitudinal yarns 13, 14 remains exposed.

The application of longitudinal yarns 13, 14 onto plastic mesh tape 5 can already be accomplished in a corresponding apparatus before the plastic mesh tape, equipped with longitudinal yarns 13, 14, is wound onto supply roll 4. The possibility also exists, however, of applying longitudinal yarns 13, 14 only during or after the unwinding of plastic mesh tape 5 from supply roll 4, and then abutting partial webs 6, 7, 8 against one another in such a way that projections 11 interengage into indentations 12 in the manner of a tooth set. As is evident from the examples of partial webs 6, 7, longitudinal yarns 14 are supplemented by the complete interengagement of projections 11 and indentations 12 in such a way that the yarn density in this region is identical to the yarn density of longitudinal yarns 13 in the remaining area, and a uniform longitudinal yarn layer is thereby created (the fact that partial webs 6, 7, already located next to one another, are covered by only three longitudinal yarns 14 in the region of projections 11 and indentations 12, whereas a total of four longitudinal yarns 14 extend over projections 11 and indentations 12 of the two partial webs 7, 8 that are not yet located next to one another, is the result simply of a graphical inaccuracy).

After interengagement, longitudinal yarns 14 on longitudinal edge 9 are connected to projections 11 on longitudinal edge 10 by the action of a laser beam. Conversely, longitudinal yarns 14 on longitudinal edge 10 are connected to the projections on the abutting longitudinal edge 9, likewise by lasering.

The manner described above of connecting longitudinal edges 9, 10 can also be applied to the connection of substrate module segments 17, 18, 19 according to FIG. 3. Substrate module segments 17, 18, 19 are then equipped not only with transverse yarns 23, 24, 25 but additionally with transverse yarns 34 (applied simultaneously with transverse yarns 23, 24, 25) which extend over half the height of projections 32 and indentations 33. Only then are substrate module segments 17, 18, 19 successively abutted against one another and connected to one another, like partial webs 6, 7, 8, in the manner described above.

As FIG. 5 shows, flattening the tube produced in apparatus 1 according to FIG. 1 yields a machine felt 35 having front ends 36, 37 extending transversely to longitudinal yarns 13, 14, in the region of which ends longitudinal yarns 13, 14 are bent over 180°. Even in this region, however, longitudinal yarns 13, 14 are at first covered in matrix fashion by the previously applied fiber batt layer 38. To allow longitudinal yarns 13, 14 to be used to connect front ends 36, 37 of machine felt 35, fiber material of fiber batt layer 38 is removed from longitudinal yarns 13, 14 in this region so that longitudinal yarn loops (labeled 39, 40 by way of example) projecting from front ends 36, 37 are exposed. Longitudinal yarn loops 39, 40 form respective channels 41, 42 proceeding along front ends 36, 37.

In order to connect front ends 36, 37 of machine felt 35, longitudinal yarn loops 39, 40 are caused to overlap (as depicted in FIG. 5) so that one longitudinal yarn loop 39 on front end 36 always fits between two longitudinal yarn loops 40 on the other front end 37, and the same is true conversely. A common coupling channel 43 is thereby formed by longitudinal yarn loops 39, 40, through which channel a coupling wire 44 can be inserted as is apparent from FIG. 5. Coupling wire 44 then connects front ends 36, 37 of machine felt 35 in a hinge-like fashion.

We claim:

1. A method for manufacturing a machine felt (35) of finite length, comprising the steps of:
providing a tube having at least one longitudinal yarn layer, made up respectively of longitudinal yarns (13, 14) proceeding in parallel fashion, is manufactured with a peripheral length that corresponds to at least double the length of the machine felt (35) to be produced, and with a width that corresponds at least to the width of the machine felt (35) to be produced; and
compressing the tube into a flattened tube (16) with mutual abutment of its inner sides and with the formation of front ends (36, 37) and of longitudinal yarn loops (39, 40),
exposing the yarn loops (39, 40) by the removal of fibers of a previously applied fiber batt layer (38), with formation of a respective channel (41, 42) extending along the associated front end (36, 37), manufacturing at least one auxiliary substrate web (5) with a width that is less than that of the machine felt (35) that is to be produced; for the longitudinal yarns (13, 14) and/or for the at least one auxiliary substrate web (5), at least in part a material is used that has the property of absorbing laser energy and of being capable of being brought by means of laser energy, at least superficially and at least partially, to melting temperature;

the longitudinal yarns (13, 14) are brought together with the auxiliary substrate web (5) in its longitudinal direction and connected to one another by the action of a laser beam; the auxiliary substrate web (5) is or are helically wound until the tube is formed; and upon exposure of the longitudinal yarn loops (39, 40), the portion of the auxiliary substrate web(s) (5) present there is also removed.

2. The method according to claim 1, wherein at least one transverse yarn layer, having transverse yarns (23, 24, 25, 34) proceeding continuously and parallel to one another over the width of the tube or flattened tube (16), are applied onto the inner and/or outer side of the tube or at least on one of the two outer sides of the flattened tube (16).

3. The method according to claim 2, wherein the transverse yarn layer or layers is or are applied in such a way that it or they is or are located externally and/or internally after connection of the front ends (36, 37) of the machine felt (35).

4. The method according to claim 2, wherein for manufacture of the transverse yarn layer, firstly individual substrate module segments (17, 18, 19) are manufactured, having an extension in one direction of the substrate module segments (17, 18, 19) that corresponds to the width necessary for manufacture of the completed machine felt (35), the substrate module segments (17, 18, 19) each being constituted by the combination of an auxiliary substrate web (20, 21, 22) with yarns (23, 24, 25, 34) fastened thereonto; and the auxiliary substrate web (20, 21, 22) and/or the yarns (23, 24, 25, 34) have the property of absorbing laser energy and of being capable of being brought by means of laser energy, at least superficially and at least partially, to melting temperature; the connection between the auxiliary substrate web(s) (20, 21, 22) and the yarns (23, 24, 25, 34) is produced by the action of a laser beam; and the substrate module segments (17, 18, 19) are successively placed on and against one another onto the tube or the flattened tube (16) in its longitudinal direction, in such a way that the transverse yarn layer is thereby created.

5. The method according to claim 4, wherein the auxiliary substrate web(s) (20, 21, 22) for the substrate module segments (17, 18, 19) is manufactured with an extension, transversely to the yarns (23, 24, 25, 34), of 0.4 to 6 m.

6. The method according to claim 1, wherein the auxiliary substrate web(s) (5) for the longitudinal yarns (13, 14) is or are manufactured with a width from 0.2 m to 1.5 m.

7. The method according to claim 1, wherein the auxiliary substrate web(s) (5, 20, 21, 22) has or have a structural strength such that after the machine felt is completed, they exist in a state that is undamaged or at most damaged so that they still connect the yarns (13, 14, 23, 24, 25, 34) in positionally stabilizing fashion.

8. The method according to claim 1, wherein a mesh, a fiber batt, and/or a perforated film is or are used for the auxiliary substrate web(s) (5, 20, 21, 22).

9. The method according to claim 1, wherein the auxiliary substrate web(s) (5, 20, 21, 22) has or have a basis weight from 20 to 250 g/m2.

10. The method according to claim 1, wherein the yarns (13, 14, 23, 24, 25, 34) are arranged parallel to the parallel side edges of the respective auxiliary substrate web (5, 20, 21, 22).

11. The method according to claim 1, wherein for the yarns (13, 14, 23, 24, 25, 34) and/or for the at least one auxiliary substrate web (5, 20, 21, 22), a material is used which contains an additive that makes the yarns (13, 14, 23, 24, 25, 34) or the auxiliary substrate web(s) (5, 20, 21, 22) capable of absorbing laser energy.

12. The method according to claim 1, wherein the mutually abutting edges (9, 10; 26-31) of the auxiliary substrate web(s) (5, 20, 21, 22) are connected to one another.

13. The method according to claim 12, wherein the edges are caused to overlap and are connected to one another in the overlap region.

14. The method according to claim 12, wherein the edges (9, 10; 26-31) are butted against one another.

15. The method according to claim 12, wherein the edges are stitched and/or welded and/or adhesively bonded to one another.

16. The method according to claim 14, wherein the edges (9, 10; 26-31) are equipped with successive, complementary projections (11, 32) and indentations (12, 33); and the edges (9, 10; 26-31) are mutually abutted so that they interengage with their projections (11, 32) and indentations (12, 33); and projections (11, 32) of the mutually abutting edges (9, 10; 26-31) are connected to one another.

17. The method according to claim 16, wherein after interengagement of the projections (11, 32) and indentations (12, 33), at least one yarn (14, 34) is laid over the projections (11, 32) and fastened to them.

18. The method according to claim 17, wherein prior to interengagement of the projections (11, 32) and indentations (12, 33), at least one yarn (14, 34) is laid over the projections (11, 32) and indentations (12, 33) and connected, at least one edge (9, 10; 26-31), to the projections (11, 32); and after interengagement of the projections (11, 32) and indentations (12, 33), the at least one yarn (14, 34) is also fastened to the projections (11, 32) of the butt-joining edge (9, 10; 26-31).

19. The method according to claim 18, wherein at least one yarn (14, 34) is connected to the projections (11, 32) of both edges (9, 10; 26-31) of the auxiliary substrate web(s) (5, 20, 21, 22).

20. The method according to claim 14, wherein the yarns (14, 34) proceeding over the edges (9, 10; 26-31) correspond to the other yarns (13, 23, 24, 25).

21. The method according to claim 16, wherein the yarns (14, 34) are applied onto the projections (11, 32) in a quantity and at a spacing such that after interengagement, the yarn density in the region of the edges (9, 10; 26-31) does not deviate from the yarn density elsewhere.

22. The method according to claim 1, wherein the fiber batt layer (38) is manufactured by needle felting at least one fiber batt web onto the tube or onto the flattened tube (16).

23. The method according to claim 1, wherein the fiber batt layer (38) is manufactured at least in part by the fact that at least one fiber batt web having the width of the auxiliary substrate web (5, 20, 21, 22) is needle felted, before or during winding, onto the combination of auxiliary substrate web (5, 20, 21, 22) and yarns (13, 14, 22, 23, 24, 34).

24. The method according to claim 1, wherein the auxiliary substrate web(s) (5, 20, 21, 22) has or have a basis weight from 30 to 200 g/m2.

25. A machine felt (35) of finite length having a substrate and having a fiber batt layer (38) fastened to the substrate, the substrate comprising yarns (13, 14, 22, 23, 24, 34) that are arranged in a tube which is compressed to form longitudinal yarn layers arranged one above another and having longitudinal yarns (13, 14), extending respectively in parallel fashion and spaced apart from one another, and that form longitudinal yarn loops (39, 40) protruding at front ends (36, 37) from the fiber batt layer (38) of the machine felt (35), wherein the longitudinal yarns (13, 14), with the exception of the longitudinal yarn loops (39, 40), are fastened to at least one auxiliary substrate web (5) present in an undestroyed state, said yarn loops (39, 40) protruding from said auxiliary web substrate, and wherein yarns (13, 14, 23, 24, 25, 34) contain an additive that makes them capable of absorbing laser energy, and the yarns (13, 14, 23, 24, 25, 34) are connected to the auxiliary substrate web (5, 20, 21, 22) by fusing of the yarns (13, 14, 23, 24, 25, 34) and of the substrate web (5, 20, 21, 22).

26. The machine felt according to claim 25, wherein the longitudinal yarn structures are constituted by at least one longitudinal yarn helically wound transversely to the longitudinal direction.

27. The machine felt according to claim 26, wherein the longitudinal yarn structures are constituted by at least one group, made up respectively of multiple longitudinal yarns (13, 14), that are helically wound transversely to the longitudinal direction.

28. The machine felt according to claim 25, wherein the substrate comprises, at least on an outer side of the longitudinal yarn layer or layers, further yarns (23, 24, 25, 34) that constitute at least one transverse yarn layer having transverse yarns (23, 24, 25, 34) proceeding parallel to one another continuously over the width of the machine felt (35).

29. The machine felt according to claim 28, wherein a transverse yarn layer is applied exclusively onto that outer side of the longitudinal yarn layer or layers which is externally and/or internally located after connecting of the front ends (36, 37) of the machine felt (35).

30. The machine felt according to claim 28, wherein the number of yarns per unit length is different in the longitudinal yarn layer than in the transverse yarn layer.

31. The machine felt according to claim 28, wherein the number of yarns in the transverse yarn layer is between 20 and 100 yarns per cm.

32. The machine felt according to claim 25, wherein the number of yarns in the longitudinal yarn layer is between 10 and 100 yarns per cm.

33. The machine felt according to claim 25, wherein the auxiliary substrate web(s) (5, 20, 21, 22) exists in a state that is undamaged or damaged at most so that it connects the longitudinal yarns (13, 14) and transverse yarns (23, 24, 25, 34) in positionally stabilizing fashion.

34. The machine felt according to claim 25, wherein the auxiliary substrate web(s) (5, 20, 21, 22) is or are configured as a mesh, a fiber batt, and/or a perforated film.

35. The machine felt according to claim 25, wherein the auxiliary substrate web(s) (5, 20, 21, 22) has or have a basis weight from 20 to 250 g/m2.

36. The machine felt according to claim 25, wherein a further material web is arranged between at least two longitudinal yarn layers.

37. The machine felt according to claim 28, wherein the number of yarns in the transverse yarn layer is between 30 and 60 yarns per cm.

38. The machine felt according to claim 25, wherein the number of yarns in the longitudinal yarn layer is between 20 and 50 yarns per cm.

39. The machine felt according to claim 25, wherein the auxiliary substrate web(s) (5, 20, 21, 22) has or have a basis weight from 30 to 200 g/m2.

* * * * *